No Printed Specification Available
5247X
R. WINANS.
Car Truck.
Patented Oct. 11, 1828.
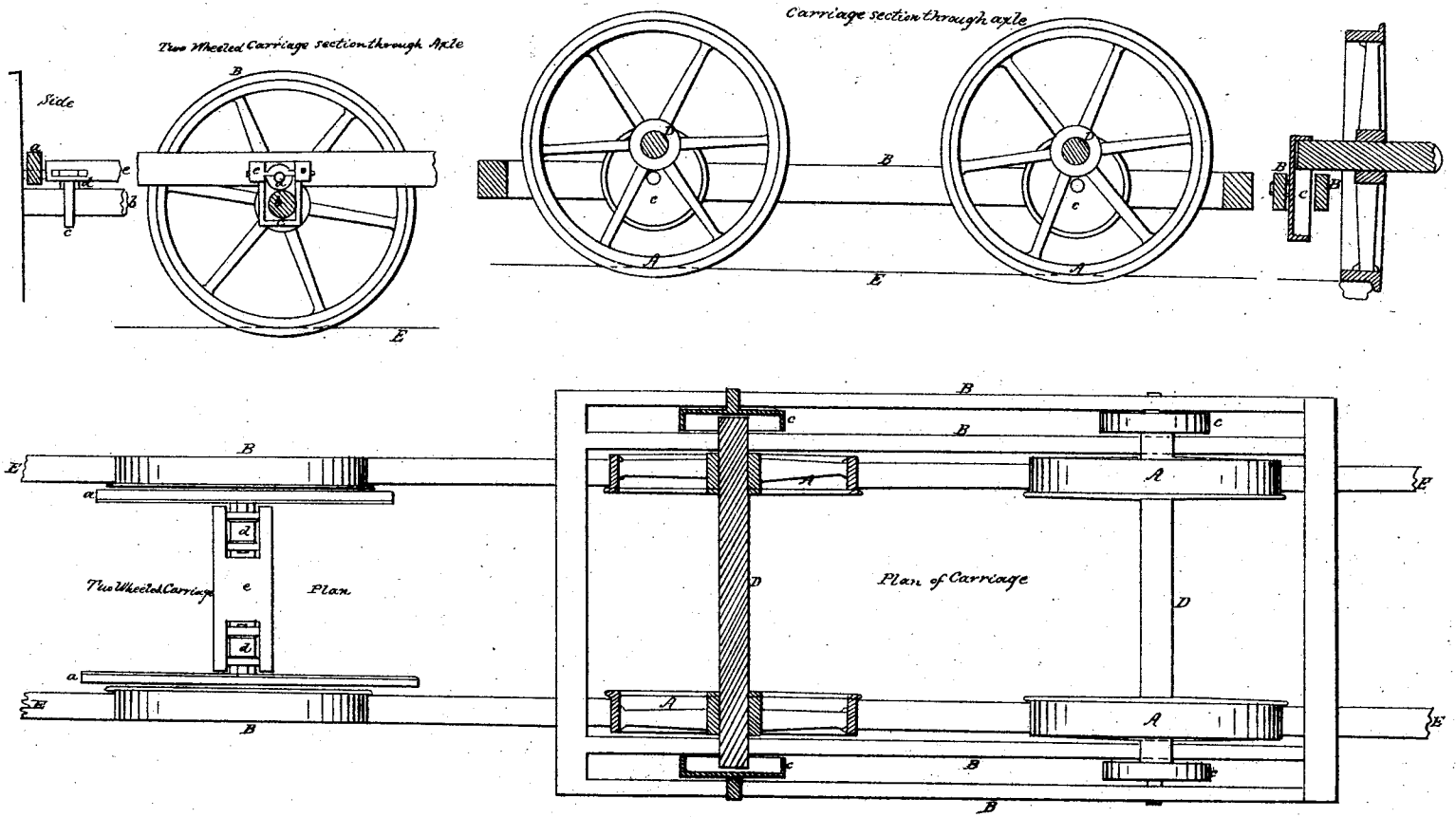
AM. PHOTO-LITHO. CO. N.Y. (OSBORNE'S PROCESS.)

MISSING PAGE TEMPORARY NOTICE

PATENT # 5247X FOR ISSUE DATE 10/7/1828

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text